United States Patent
Fox, Jr.

(10) Patent No.: US 6,843,451 B1
(45) Date of Patent: Jan. 18, 2005

(54) PARACHUTE SLIDER REEFING WITH FRICTION INDUCED RETARDATION

(76) Inventor: Roy L. Fox, Jr., Rte. 1 Box 32A, Belleville, WV (US) 26133

( * ) Notice: Subject to any disclaimer, the term of this patent is extended or adjusted under 35 U.S.C. 154(b) by 0 days.

(21) Appl. No.: 10/746,826

(22) Filed: Dec. 29, 2003

(51) Int. Cl.⁷ .............................................. B64D 17/34
(52) U.S. Cl. ...................................... 244/152; 244/149
(58) Field of Search ................................ 244/147, 149, 244/152; 188/65.1, 65.2, 65.4

(56) References Cited

U.S. PATENT DOCUMENTS

| | | | |
|---|---|---|---|
| 1,771,261 A | * 7/1930 | Lendner | ..................... 244/142 |
| 2,566,585 A | 9/1951 | Smith | |
| 2,754,074 A | * 7/1956 | Schade | ....................... 244/152 |
| 4,399,969 A | 8/1983 | Gargano | |
| 4,664,342 A | * 5/1987 | Jones | ......................... 244/147 |
| 4,846,423 A | 7/1989 | Reuter | |
| 4,863,119 A | 9/1989 | Case | |
| 5,005,785 A | 4/1991 | Puskas | |

* cited by examiner

Primary Examiner—Michael J. Carone
Assistant Examiner—T. Nguyen

(57) ABSTRACT

A novel parachute slider reefing process enhancement is presented that is distinguished by being significantly less dependent on aerodynamic forces than its predecessors and can, therefore, be designed to perform in a much more precise and predictable manner. This unique means of prolonging the effective reefing time of a parachute reefing slider means consists of adding a cord that extends downward from the lower region of the parachute canopy, to terminate near the lower end of the suspension network, along with a restriction means, to act in conjunction with the cord, to extend the reefed time interval beyond that which is typically provided by aerodynamic forces acting on the slider body.

1 Claim, 7 Drawing Sheets

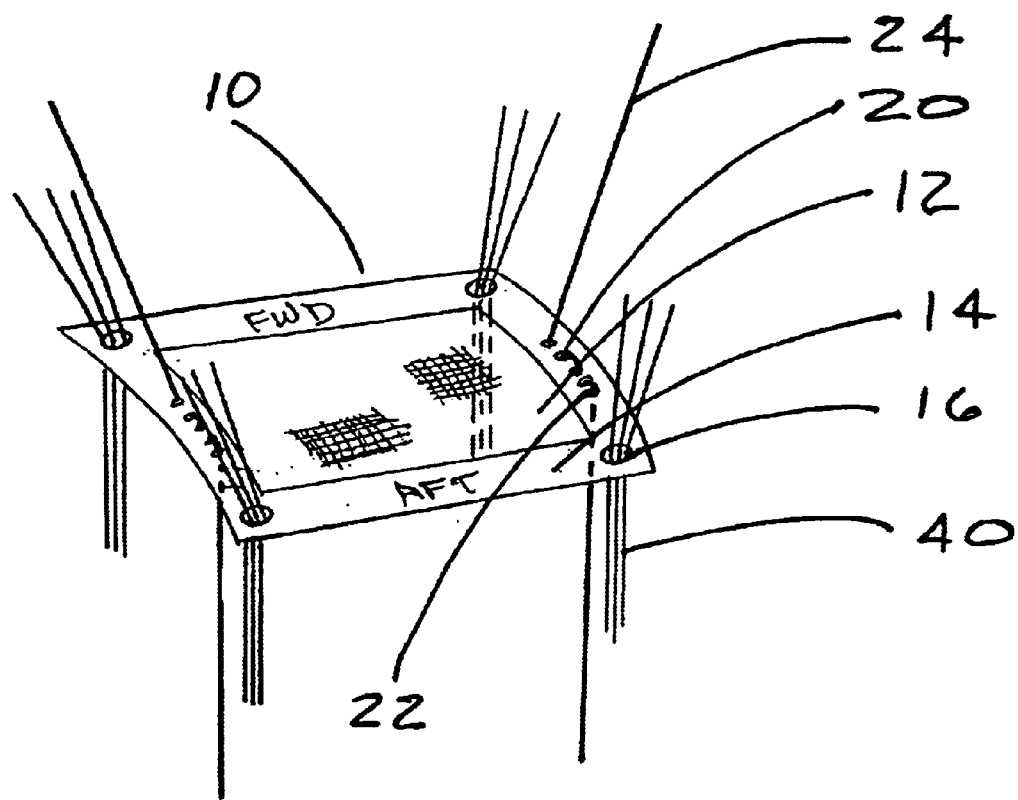
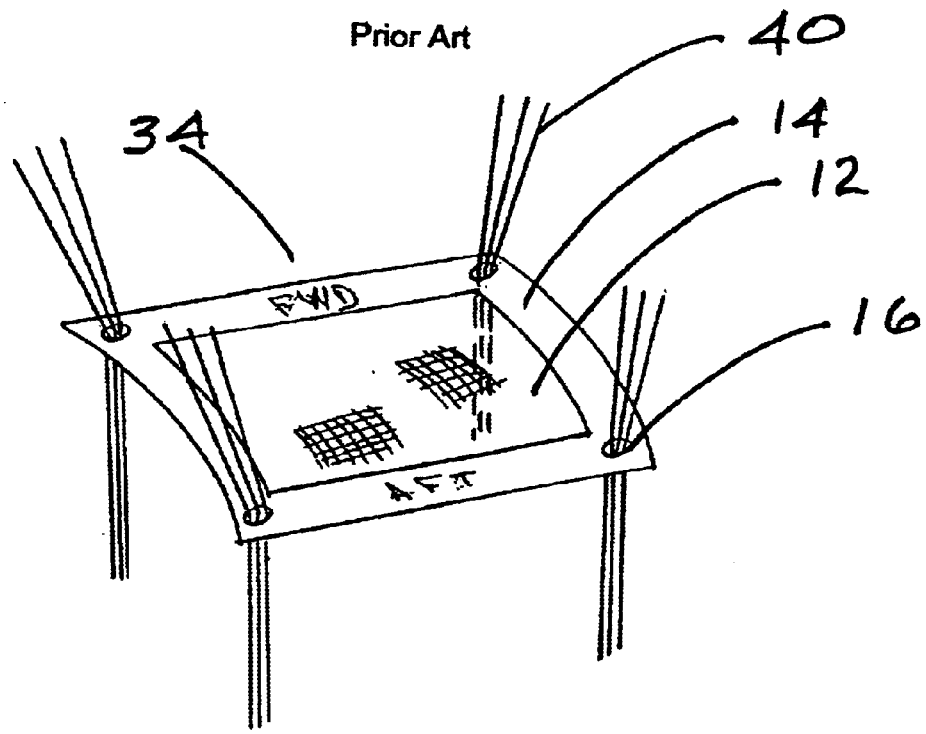
Figure 2
Prior Art

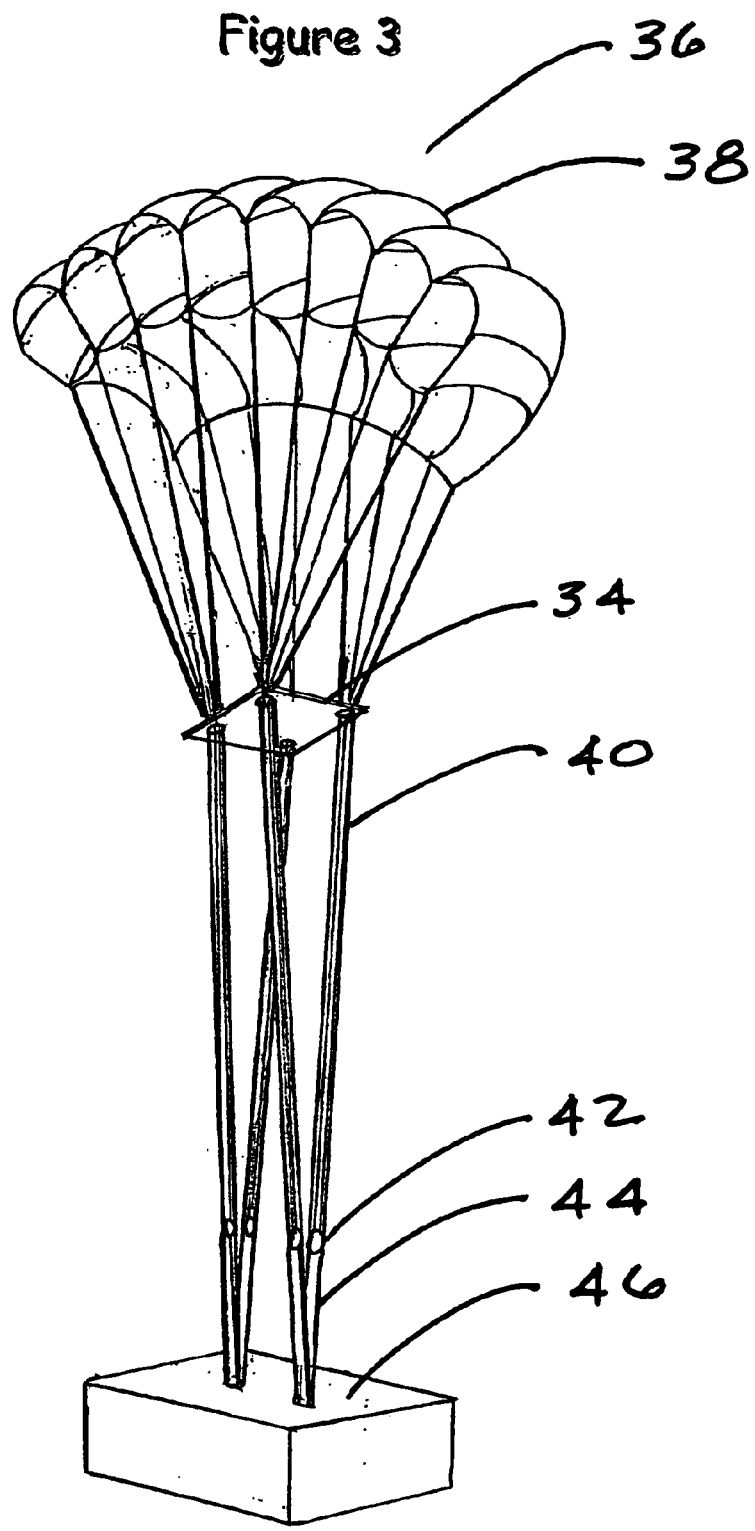

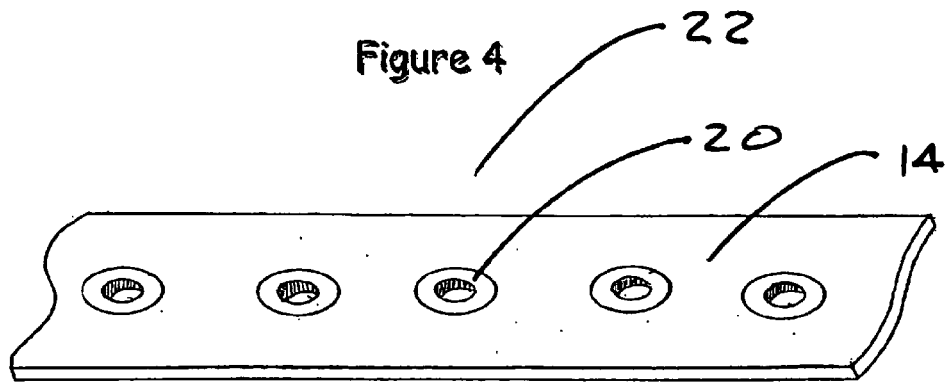
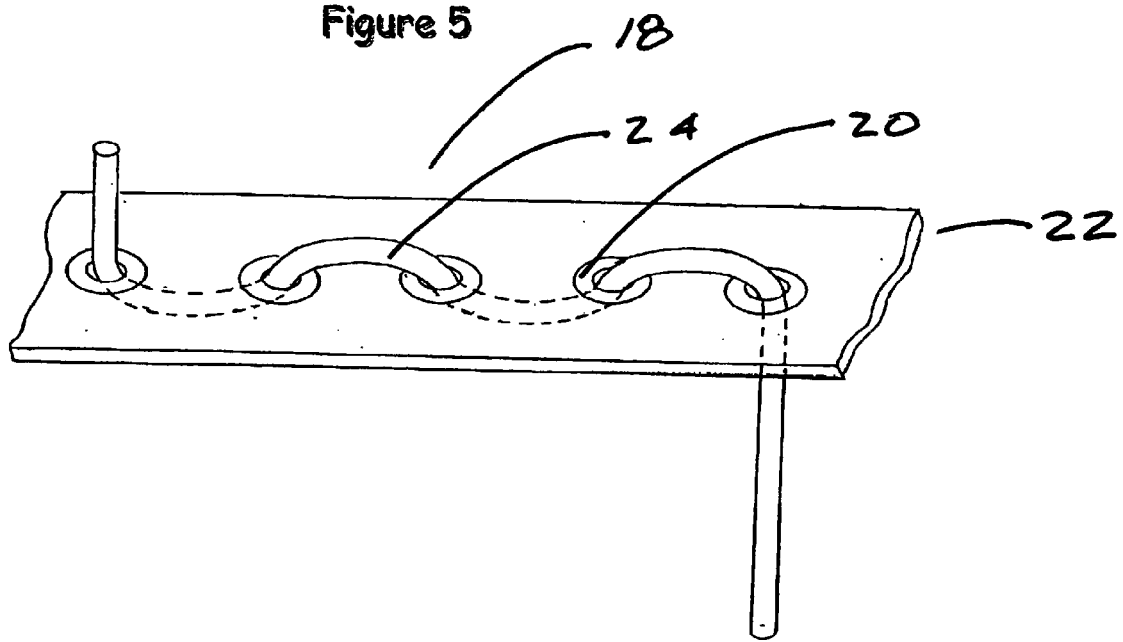

PARACHUTE SLIDER REEFING WITH FRICTION INDUCED RETARDATION

FIELD OF THE INVENTION

The present invention relates to the field of parachutes and, more particularly, to a slider reefing means which constricts the suspension lines of a parachute to extend the parachute inflation process for decreasing the opening forces that may otherwise cause damage or injury.

Quite frequently parachutes require some means to prolong the time period that extends from the initial parachute canopy deployment until the full open condition is complete. The prolonging process is typically referred to as reefing and is required to properly manage the forces generated during what is commonly known a opening shock.

Temporarily constricting the diameter of a parachute skirt with short, releasable, circumferential cords is the most common means of reefing a circular parachute but slider reefing, such as taught in U.S. Pat. No. 4,863,119, is sometimes used. Slider reefing, however, is more commonly used for reefing pairfoils, a more modern, ram-air inflated wing type parachute, which is used almost universally by present day skydivers. The basic reefing slider device and some improved sliders are taught in U.S. Pat. Nos. 2,566, 585; 4, 399,969; 4,863,119 and 5,005,785.

Generally, a reefing slider device for a parafoil type parachute consists of a reinforced, flat membranous panel, square or rectangular in shape, having a grommet or ring installed at each corner to provide an orifice to allow free passage of all suspension lines, and control lines, from the corresponding quadrant of the parafoil canopy. Sliders for parachutes having more than four suspension line divisions must have an additional orifice for each additional suspension line or suspension line group. Essentially, sliders, and the orifices through which the suspension lines pass, act as temporary constrictors around the suspension lines to delay the spreading action of the parachute.

Because reefing slider devices do not provide precise opening control, Reuter designed a much more sophisticated reefing means for parafoil type parachutes which is taught in U.S. Pat. No. 4,846,423. While the Reuter reefing means allows for very precise reefing control, it requires expendable pyrotechnic components, which are quite expensive, and it is very labor intensive and time consuming to prepare for each usage. This reefing means has been, therefore, utilized almost exclusively for aerospace applications, which finds the additional labor and materials costs to be acceptable because these applications often demand very precise reefing control due to their extreme operating environments.

Slider reefing, though far less precise in the amount of control provided, is extremely cost effective and simple to utilize and has been employed, almost exclusively, for reefing personnel parafoils. However, because of the simplicity and cost effectiveness, reefing sliders are now being used for reefing parachutes for other than typical personnel parafoil type parachute applications. Nevertheless, the lack of precision in slider reefed opening control continues to make the use of sliders problematic for a wide range of load/altitude/speed applications. Due to imprecise control of the reefing event, a slider reefed parafoil opening that is very acceptable at relatively low altitude and relatively low speed may injure a parachutist and/or damage the parachute at higher altitudes and/or higher speeds. The same phenomenon holds true for non-human payloads that are dependent on reefing sliders for control of opening forces. Under some opening conditions, the payload may be damaged and/or the parachute may suffer structural failure. A requirement for a drogue parachute to slow the system speed and/or alter the trajectory prior to the main parachute deployment in less than optimal conditions is quite common. In many instances, prolonging the descent time of the slider, thus lengthening the reefing time period, will mitigate that requirement.

In slider reefed parachute applications; the parachute suspension lines are typically divided into groups and the groups are threaded through corresponding, loose fitting, reinforced orifices in the slider. During the packing process, the slider is typically positioned as high as practical on the suspension lines, against the lower portion of the parachute canopy. During the parachute opening process, the slider lower surface is initially exposed to high velocity airflow, which causes it to act somewhat like a parachute and tends to keep the slider temporarily pushed against the lower portion of the parachute canopy. Coincident with the high velocity air pushing the slider upward, however, it is also causing the parachute canopy to spread and inflate. At this phase of the opening, the upper portions of the suspension lines emerge from the top of the slider orifices at high angles and produce a strong force for pushing the slider downward. The aerodynamic upward force must resist the very strong force that is pushing the slider downward and slider effectiveness is extremely dependent on the relationship between these opposite forces during this very dynamic, and often chaotic, period. The somewhat random outcome of the conflict between these two opposing forces determines, in large part, why reefing sliders work very effectively in some instances and much less effectively in others.

Primarily, the effectiveness of slider reefing, and the characteristics of the opening forces, is dependent on two things; (1) the length of time the reefing slider remains in the full-up position and (2) the length of time that is consumed by the slider during its travel from the top to the bottom of the suspension lines, with the reefing effects during the upper part of the travel being much more important than during the lower part.

Consistently controlling the point at which the forces pushing the slider upward will be overcome by the forces pushing the slider downward, and controlling the time consumed by the slider descending the suspension lines, properly regulating the parachute canopy opening, defines a successful slider reefing process.

Nearly all complaints regarding slider reefing are due to highly dynamic parachute opening forces, which result from the reefed time period being insufficient for anything other than optimal deployment/opening conditions. To combat the higher than desirable forces that result from using the basic reefing slider configuration in other than optimal conditions, various slider modifications have been devised in attempts to extend the reefing time interval provided by them. In general terms, the modifications have consisted of adding fabric to the slider, in the form of drag producing flags, or modifying the slider shape to cause it to act more like a parachute. For each of the slider modification categories, the goal has been to extend the time the slider remains against the parachute canopy lower surface and to increase the length of time consumed during the slider descent process.

As has always been true for non-modified reefing sliders, each of the afore referenced types of slider modifications is totally dependent on aerodynamic forces that are most chaotic at the very time the reefing process is occurring, which causes their performance to frequently be unpredictable and/or inadequate.

So far, no reefing slider device, even with modifications, has resulted in ideal reefing for a wide range of conditions because the chaotic aerodynamic conditions during the deployment and opening events often prevent the modifications from being precise and predictable in their performance.

BACKGROUND OF THE INVENTION

Most frequently, a reefing slider device for a parafoil type parachute consists of a reinforced fabric panel, square or rectangular in shape, having a grommet or ring in each corner to allow passage of the suspension lines from each corresponding quadrant of the parachute canopy. Essentially, sliders, and the orifices through which the suspension lines pass, act as temporary constrictors around the suspension lines to delay the spreading action of the parachute. During the packing process, the slider is typically positioned as high as practical on the suspension lines, against the lower portion of the parachute canopy. During the opening process, the slider lower surface is initially exposed to high velocity airflow, which tends to keep the slider pushed up against the parachute lower surface. However, the high velocity air that is pushing the slider upward is also causing the parachute canopy to spread and inflate. At this phase of the opening process, the upper portions of the suspension lines emerge from the slider orifices at high angles and produce strong mechanical force for pushing the slider downward. The aerodynamic upward force must resist the very strong force that is pushing the slider downward and the slider effectiveness is extremely dependent on the relationship between these two forces during this very dynamic, and somewhat chaotic, period. The somewhat random outcome of the conflict between these two opposing forces determines in large part, why slider reefing works very effectively in some instances and much less effectively in others.

A great majority of the complaints regarding slider reefing are due to highly dynamic parachute opening forces, which result from the slider reefing time period being randomly insufficient for properly controlling the parachute opening event.

The lack of precision in slider reefing control makes their use problematic for a wide range of load/altitude/speed applications. Due to imprecise control of the parachute opening process, a slider reefed parachute opening that is very acceptable at relatively low altitude and relatively low airspeed may injure a parachutist and/or damage the parachute at higher altitudes or higher speeds. The same phenomenon holds true for non-human payloads. Under some opening conditions, the payload may be damaged or the parachute may suffer structural failure due to insufficient opening control being provided by the reefing slider.

To combat the higher than desirable forces that result from using the basic reefing slider configuration, various slider modifications have been devised in attempts to increase the reefing time interval provided by the sliders for overcoming the effects of other than optimal circumstances. In general terms, the modifications have consisted of adding fabric, in the form of drag producing flags, or modifying the slider shape to cause it to act more like a parachute.

Because reefing slider devices, including the modified slider designs, do not provide precise opening control, Reuter developed a much more sophisticated reefing means for parafoil type parachutes which is taught in U.S. Pat. No. 4,846,423. This reefing means has been quite successful for aerospace applications, which often demand very precise reefing control due to their extreme operating environments.

The Reuter reefing system, while quite precise and predictable in its performance, is quite labor intensive and time consuming to prepare for use. Furthermore, it requires expendable pyrotechnic cutting devices which are quite costly and present some safety concerns when they are being installed and used. The features that make this system precise and predictable also cause it to be impractical for widespread usage.

It appears that the designers of the prior art modified reefing slider configurations did not recognize that the same sort of chaotic airflow patterns that plague conventional sliders would also plague their modified slider configurations. Because the performance characteristics of the previous modified reefing slider devices are also totally dependent on the erratic aerodynamic forces that occur at the time of parachute deployment and opening, no modified slider configuration has demonstrated precise and predictable performance over a wide performance range. Therefore, the lack of precision in slider reefing control continues to make their use problematic for a wide range of load/altitude/speed applications.

It is therefore an object of the invention to provide a performance improvement to a parachute reefing slider means.

It is another object of the invention to provide a performance improvement that is significantly less dependent on aerodynamic forces than are prior art reefing slider means.

It is another object of the invention to improve the performance of the parachute reefing slider means by incorporating a regulated friction producing slider descent retardation means.

It is another object of the invention to improve the reefing slider means by providing the friction producing means consisting of a cord which passes through a restriction means.

It is another object of the invention to produce an improved reefing slider means with reduced fabric flutter, therefore, reduced noise.

SUMMARY OF THE INVENTION

In accordance with the present invention, there is provided a novel reefing slider enhancement that is distinguished by being significantly less dependent on aerodynamic forces than has been exhibited by the prior art and can, therefore, be designed to perform in a much more precise and predictable manner than its predecessors. This unique means of prolonging the effective reefing time of a parachute reefing slider device consists of adding a cord that extends downward from the parachute canopy lower surface, to terminate near the lower end of the suspension network, along with a friction producing restriction means to act in concert with the cord. Superficially, the cord, a slider retardation cord, is nearly indistinguishable from the parachute suspension lines unless it has a color difference. Unlike the suspension lines and control lines, which pass through relatively large slider orifices, however, the slider descent retardation cord passes through a retardation cord restriction assembly that is designed to produce a regulated amount of friction when working in conjunction with the cord. The slider retardation cord and the retardation cord restriction assembly, collectively, comprise a slider descent retardation means.

As a parachute canopy initially spreads, it produces high radial spreading forces in the reefing slider body due to high outward forces from the suspension lines passing through it, and the high velocity air pushing it upward. These forces are highest at the initial opening phase of the parachute canopy, when the slider is most taut, and decrease as the opening matures and the tautness subsides. This variation in slider tautness can be utilized as one instrument for maximizing slider descent retardation when the slider is high, where maximum retardation is most desirable, as well as minimizing the slider descent retardation when the slider is low, where minimal retardation is desirable.

Any number of friction-producing means may be utilized but the one selected for this application consists of having a cord threaded, circuitously, through a restriction means, consisting of a series of grommets, installed in the slider body reinforcement material. When the slider is exposed to high spreading forces, the slider assembly, and thus the plurality of added grommets making up the retardation cord restriction assembly, will tend toward being more taut and planar than when the forces acting on the slider are low. As a result of this variation in tautness, the slider retardation cord will experience higher friction forces from the grommets, making up the retardation cord restriction assembly, early in the process, when the slider is high, and taut, than when the slider is low, and relatively slack.

Beyond simply providing a member for the friction means to grip, the physical properties of the slider retardation cord can also play a significant role in fine tuning the slider descent retardation process. For instance; given one specific restriction means, a cord with a high coefficient of friction, such as Kevlar, will produce more friction/retardation than will a cord with a low coefficient of friction, such as Spectra. Moreover, a stiff cord will produce more resistance when passing through the restriction means than will a limp cord. Additionally, relative to the passageway size through the restriction means, a large diameter cord will produce more resistance than will a small diameter cord. Therefore, by carefully selecting a slider retardation cord material with the most desirable coefficient of friction, the most desirable degree of stiffness and the most desirable diameter, or diameters, relative to the restriction means, the slider descent rate profile can be customized to fit the designer's needs.

It is most desirable to maximize slider descent retardation when the slider is high on the suspension lines and do nothing to retard it when it is low. Various means can be utilized to configure the slider retardation cord diameter and stiffness profile but a very simple technique of inserting material inside an outer sheath of hollow braided cord is quite effective. For instance, one or more strands of cord-like material can be inserted inside an outer sheath of braided cord to arrive at a desired diameter and desired degree of stiffness. The stiffness and diameter variation can be placed at any specific location along the length of the cord. The length of the stiffened and enlarged portion of the cord is also variable and can be used as an additional adjustment to the cord profile.

The technique of inserting a section of cord-like material inside a section of hollow braided cord is very common to those familiar to the art and is typically used in the process of making finger-trap splices. Configuring the slider retardation cord so that it does not have a constant diameter and/or a constant stiffness can play a very significant role in the process of controlling the slider descent rate profile. Varying the coefficients of friction over the length of the cord can also be achieved and provides the designer with yet another means of controlling the slider descent rate characteristics. As an example; the uppermost portion of the cord can be made of high coefficient of friction Kevlar material spliced to a center section of medium coefficient of friction material, such as nylon, which can be spliced to a lower section of low coefficient material, such as Spectra.

It is highly recommended that the top of the slider retardation cord be securely anchored to the parachute canopy and that the bottom of the cord be securely anchored near the bottom of the suspension members because a slider retardation cord configuration that is secured at both ends is considered to have very little potential for increasing parachute opening malfunctions.

It is fully recognized, however, that a slider descent retardation cord can be anchored at one end only, and become a dangling/trailing member after it has been extracted from the restriction means. Such a slider retardation cord configuration provides for zero restriction to the slider after it separates from the restriction assembly, which may sometimes be desirable, but it then provides an entanglement potential, which is extremely undesirable.

For extending the reefing process; if the components are properly designed and fabricated, there is no functional difference between the fully anchored configuration and the partially anchored configuration. However, the partially anchored configuration will have a dangling/trailing slider retardation cord and the fully anchored one will not. Very importantly, having a slider retardation cord that is anchored at both ends, preventing its escape from the restriction means during routine operation, will also avoid many packing and rigging complications during subsequent repacking that may cause parachute malfunctions. Furthermore, having a slider retardation cord that remains threaded through the retardation cord restriction assembly, and is anchored at both ends, will decrease the amount of slider flutter and the associated noise.

It is fully recognized that the selected restriction means can be attached to the parachute canopy instead of to the slider. It is further recognized that one end of the slider retardation cord can be anchored to the canopy and the opposite end can be anchored to the slider, with the slack cord being stowed on the slider or parachute canopy until it is elongated, as the slider moves down the suspension lines, during the parachute opening process.

For any configuration that does not have one end of the slider retardation cord secured to the parachute canopy and the opposite end anchored near the bottom of the suspension network, slack retardation cord will result, at some phase, and great care must be exercised to properly rig and control the slack to avoid unduly increasing entanglement risks.

Even under typical conditions, sliders will occasionally fail to descend entirely to the bottom of the suspension lines and great care should be exercised to avoid exacerbating this undesirable phenomenon when any slider retardation configuration is introduced.

Because the reefing slider design taught herein is not especially dependent on aerodynamic drag to function properly, in some applications, the amount of fabric comprising the slider can be reduced, thereby reducing drag, and having less drag after a gliding parafoil type parachute is fully open is typically very desirable. Additionally, a flagging and flapping slider is quite noisy. Using a smaller amount of fabric in the slider configuration will, to some degree, reduce flagging and flapping, and, thereby the noise, which can be extremely desirable for covert military operations. In some instances, the membranous fabric of the slider may be replaced with highly permeable mesh, or made of skeletal webbing, which will produce even less drag and less noise.

While the slider reefing process is most often used for parafoil type parachutes; as previously written, reefing sliders are sometimes used with the more widely known circular/hemispherical type parachutes. The means to prolong the effective reefing time of a parafoil type parachute, which has been outlined here, is also compatible with most circular/hemispherical type parachutes as well as some cruciform type parachutes.

BRIEF DESCRIPTION OF THE DRAWINGS

A complete understanding of the present invention may be obtained by reference to the accompanying drawings, when considered in conjunction with the subsequent, detailed description, in which:

FIG. 1 is a perspective view of an improved reefing slider means having the conventional components, along with suspension lines, plus a friction producing slider descent retardation means;

FIG. 2 is a perspective view of a typical reefing slider means with suspension lines passing through a relatively large grommet in each corner;

FIG. 3 is a perspective view of a parafoil type parachute system with a conventional reefing slider means;

FIG. 4 is a perspective view of a retardation cord restriction assembly comprised of small grommets installed in a slider reinforcement member;

FIG. 5 is a perspective top view of a slider descent retardation means comprised of a friction producing retardation cord restriction assembly and a slider retardation cord;

For purposes of clarity and brevity, like elements and components will bear the same designations and numbering throughout the FIGURES.

DESCRIPTION OF THE PREFERRED EMBODIMENT

Figure 6:
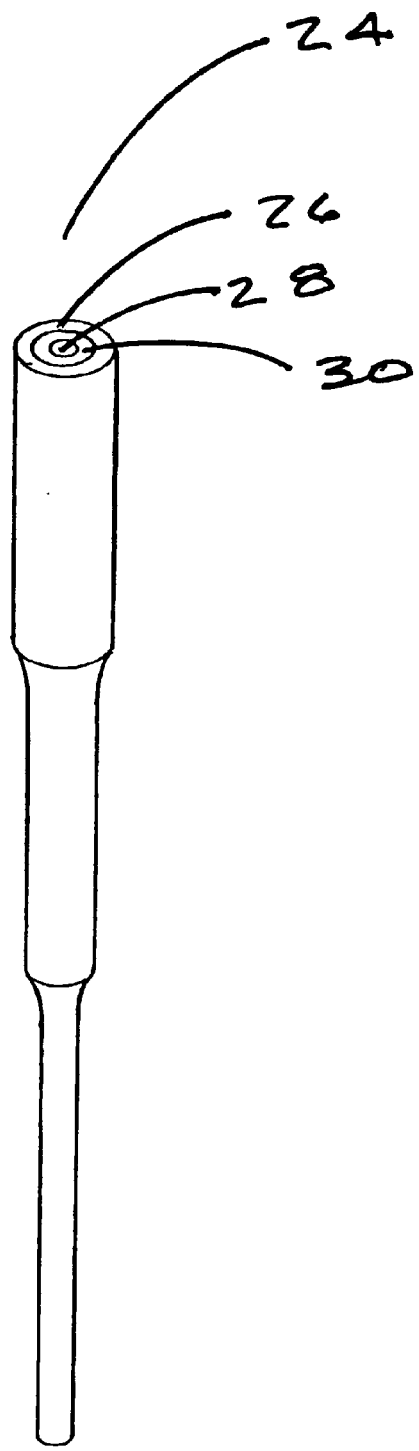
FIG. 6 is a perspective view of a slider retardation cord having three discrete diameters comprised of an outer sheath, an intermediate ply, and a short ply.

FIG. 1 is a prospective view of an improved reefing slider means 10 consisting of a; a fabric membrane 12, a slider reinforcement member 14, large corner grommet 16, small grommets 20 making up a retardation cord restriction assembly 22, a slider retardation cord 24 and suspension lines 40 passing through the large corner grommets 16.

FIG. 2 is a prospective view of a conventional reefing slider means 34, having a fabric membrane 12, a slider reinforcement member 14, large corner grommet 16, and suspension lines 40 passing through the large corner grommets 16.

FIG. 3 is a perspective view of a ram-air inflated, multiple cell, parafoil type parachute assembly 36 having a conventional reefing slider means 34. The parachute assembly 36 includes a parachute canopy 38, which is the primary drag or lift producing element of the parachute assembly 36, from which a parachutist or payload 46 is suspended by a plurality of downwardly converging suspension lines 40, which are joined to suspension riser assembly 44 with connector means 42.

FIG. 4 is a perspective view of a retardation cord restriction assembly 22 comprised of small grommets 20 installed in a slider reinforcement member 14.

FIG. 5 is a prespective view of a slider descent retardation means 18 having a slider retardation cord 24 threaded, circuitously, through the small grommets 20 which are installed in a slider reinforcement member 14, comprising the retardation cord restriction assembly 22.

FIG. 6 is a prospective view of a slider retardation cord 24 having three discrete diameters comprised of an outer sheath 26, an intermediate ply 30, and a short ply 28.

Figure 7:
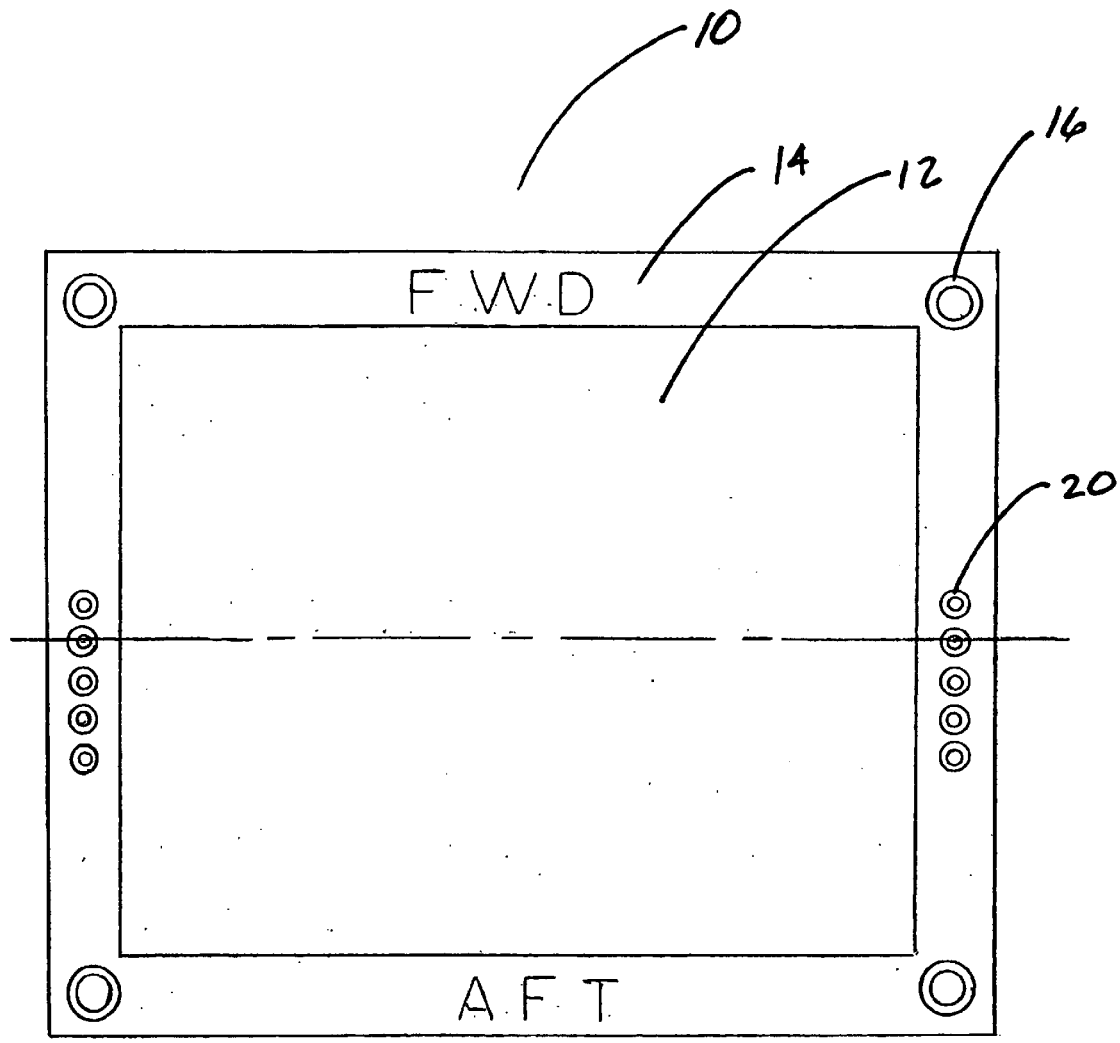
FIG. 7 is a top view of a schematic drawing of an improved reefing slider means consisting of a fabric membrane, large corner grommets, and a retardation cord restriction assembly, comprised of small grommets, installed in the slider reinforcement member.

FIG. 7 is a top view schematic of the improved reefing slider means 10 consisting of a fabric membrane 12, large corner grommets 16, and a retardation cord restriction assembly 22 comprised of small grommets 20 installed in a slider reinforcement member 14.

Figure 8:
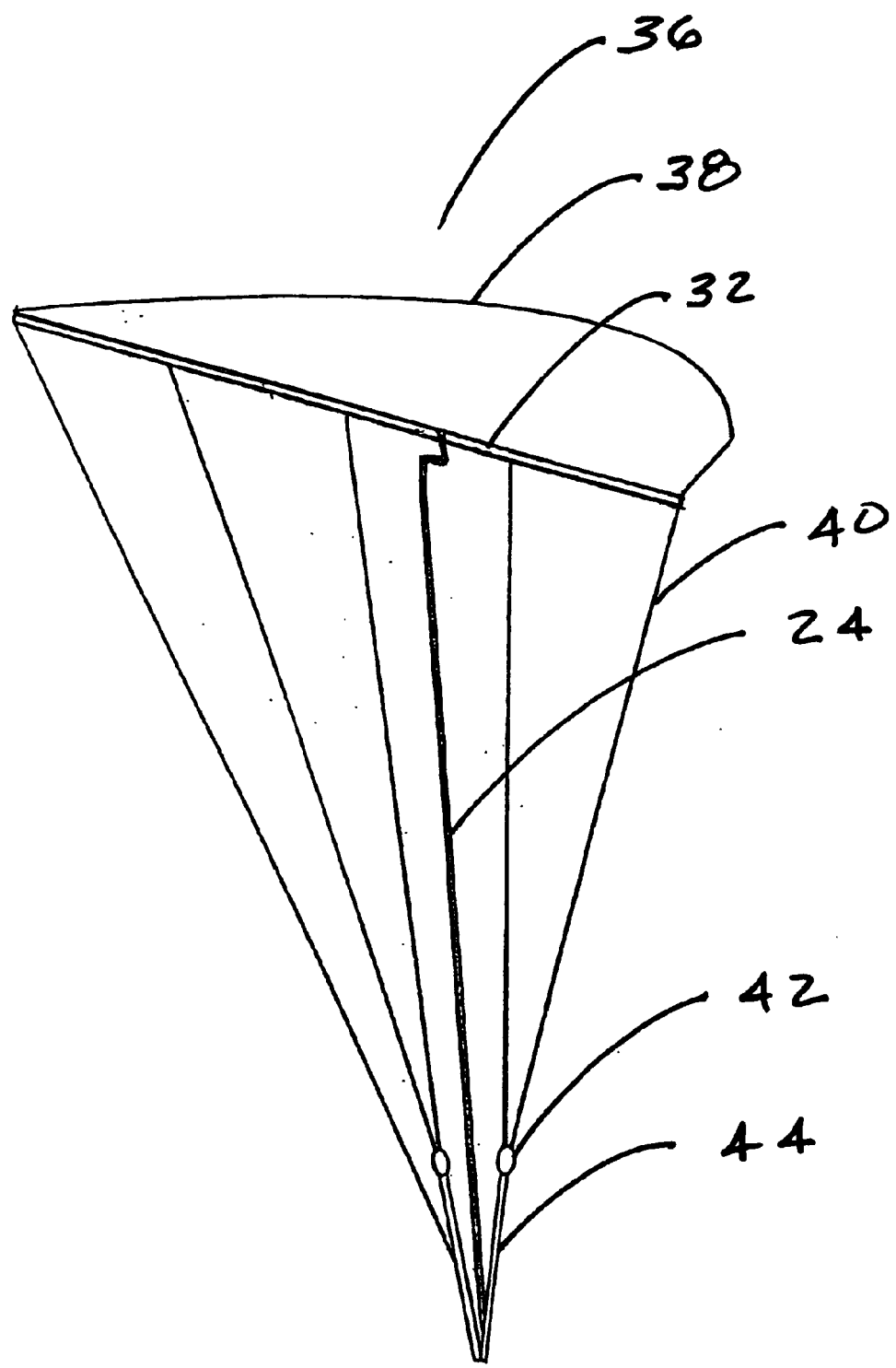
FIG. 8 is a cross sectional view of an inflated parafoil type parachute including a canopy, lower surface keel member, slider retardation cord, suspension lines, suspension member connecting means, and a suspension riser assembly.

FIG. 8 is a side cross sectional view of an inflated parafoil type parachute assembly 36 having a parachute canopy 38, a lower surface keel member 32, suspension lines 40, connector means 42, suspension riser assembly 44, and a slider retardation cord 24.

Figure 9:
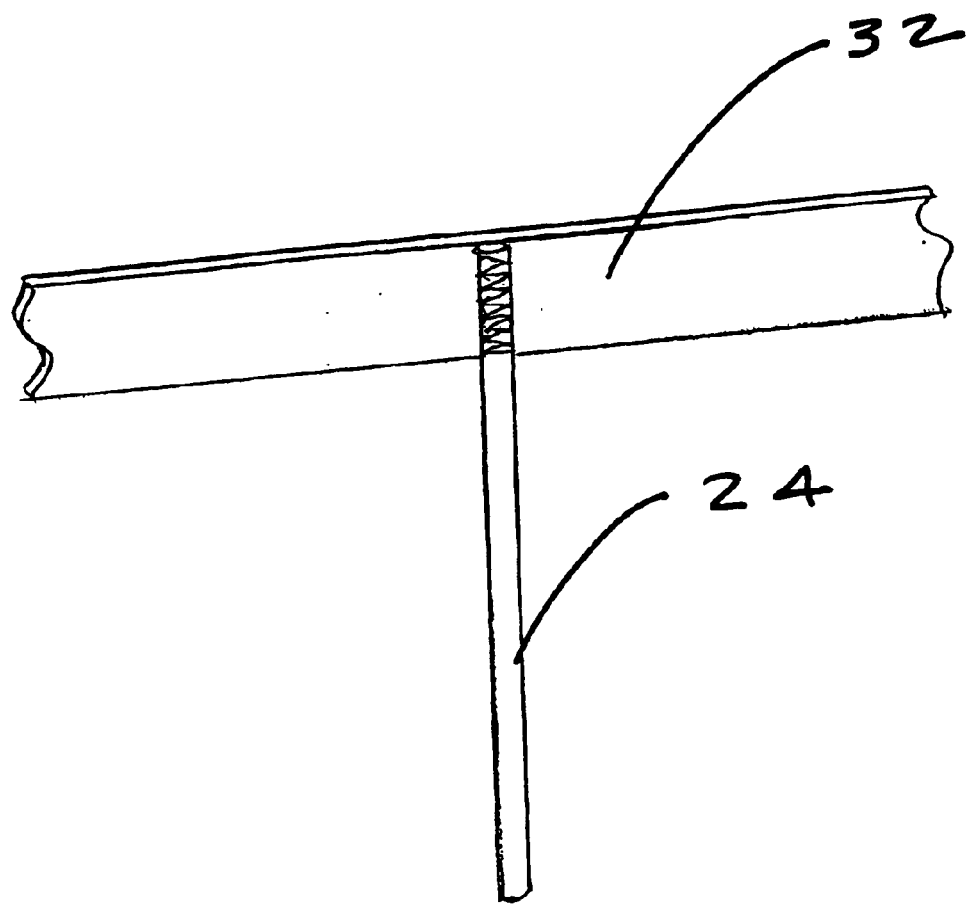
FIG. 9 is a side view of a slider retardation cord sewn to a parachute canopy lower surface keel member.

FIG. 9 is a prospective view of a lower surface keel member 32 with a slider retardation cord 24 anchored to it.

When a parafoil type parachute assembly 36 is initially deployed, the parachute canopy 38 is typically spread and inflated by a relatively high velocity air inflow. Retarding the spreading and inflation of the parachute canopy 38 is the reefing slider means 34 that is being pushed upward by the airflow and, simultaneously, downward by outward and downward tension in the suspension lines 40.

As the parachute canopy 38 spreads, it produces high tension radial forces throughout the reefing slider means 34 due to high outward and downward forces from the suspension lines 40 passing through the orifices provided by the large corner grommets 16 in the reefing slider means 34 and high relative velocity air pushing the reefing slider means 34 upward. Over time, the parachute canopy 38 will enlarge and produce sufficient drag to slow the parachute assembly 36, which will cause a decrease in the relative air velocity and, simultaneously, the reefing slider means 34 will descend, decreasing its constricting effectiveness on the suspension lines 40, and, in the process, the reefing slider means 34 will experience decreased radial tension loading and will become increasingly slack as it descends the suspension lines 40.

To extend the descent time of a conventional reefing slider means 34, the improved reefing slider means 10 consists of installing additional relatively small grommets 20 in the slider reinforcement member 14 to create an improved reefing slider means 10 having a retardation cord restriction assembly 22. Passing circuitously through the small grommets 20 making up the retardation cord restriction assembly 22 is the slider retardation cord 24, as depicted in FIG. 1 and FIG. 3. At approximately 0.875 inch spacing, the small grommets 20 are installed as depicted in FIG. 6. One of the small grommets 20 is installed forward of the centerline small grommet 20 and three of the small grommets 20 are installed aft of the centerline small grommet 20.

Using bar-tack stitching, or any of the many other attachment means familiar to those in the art, the enlarged, multiple ply, end of the slider retardation cord 24 is attached to one of the two lower surface keel members 32, as depicted in FIG. 8 and FIG. 9. As an example; the center lower surface keel members 32 for a 7-cell parachute canopy 38 are numbers 4 and 5. For a 9-cell parachute canopy 38 the lower surface members 32 are numbers 5 and 6. After passing, circuitously, through small grommets 20, comprising the retardation cord restriction assembly 22, as depicted in FIG. 1 and FIG. 3, the single ply end of slider retardation cord 24 is similarly attached to the lower inside face of a suspension riser assembly 44.

To prevent the slider retardation cord 24 from becoming a load-path for the suspended payload 46, the slider retardation cord 24, comprising an outer sheath 26, an intermediate ply 30, and a short ply 28, should have a finished length of appropriately 103% of the distance from its attachment point on the parachute canopy 38 lower surface keel member 32 to its attachment point on the suspension riser assembly 44. If the slider retardation cord 24 is constructed to a length that allows it to act as a suspension member load path between the parachute canopy 38 and the suspension riser assembly 44, it will adversely effect the behavior of the improved reefing slider means 10 and will likely prevent the improved reefing slider means 10 from descending fully to the bottom of suspension lines 40.

The slider retardation cord 24 consists of an approximately 24 inch length of 750 lb. tensile strength, hollow braided, Kevlar cord, short ply 28, inserted inside an approximately 48 inch length of 750 lb. tensile strength, hollow braided, Kevlar cord, intermediate ply 30, inserted inside the outer sheath 26, which is also 750 lb. tensile strength, hollow braided, Kevlar cord. The small metal grommets 20 used for construction of the retardation cord restriction assembly 22 are known in the trade as size 0.

In this instance, dual slider descent retardation means 18, comprising retardation cord restriction assembly 22 and slider slider retardation cord 24, have been configured for a parafoil type parachute assembly 36 of approximately 210 square feet having a parachute canopy 38 aspect ratio of approximately 2.5:1 with a suspended load 46 of approximately 210 lb.

Obviously, larger or smaller parachutes and/or heavier or lighter suspended loads, along with predicted deployment conditions will dictate the number of slider descent retardation means 18 used in addition to dictating the size, strength and the quantity of components utilized.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. In a parafoil type parachute assembly including a parachute canopy for acting as a primary lift or drag producing element of the parachute assembly, a suspension lines for joining the parachute canopy to a suspended payload and for balancing the parachute assembly, the improvement is an improved parafoil type parachute assembly with friction induced retardation for the purpose of extending the parachute inflation process comprising:

an improved reefing slider means consisting of: a fabric membrane means for providing drag to the reefing slider means; a slider reinforcement member means for providing structural support to the reefing slider means and a foundation for the friction induced retardation, wherein the slider reinforcement member means locates on the periphery of the fabric membrane means; a plurality of large corner grommet means for providing constriction to the suspension lines wherein the large corner grommet means locates on the periphery of the fabric membrane means, wherein the plurality of large corner grommet means having diameters; a slider retardation cord means for producing friction to retard the descent of the reefing slider means, wherein the slider retardation cord means having three discrete diameters comprises of an outer sheath means having a diameter, an intermediate ply means having a diameter less than the diameter of the outer sheath means, and a short ply means having a diameter less than the diameter of the intermediate ply means; a slider descent retardation means for producing friction to retard the descent of the reefing slider means, wherein the slider descent retardation means comprises of a plurality of small grommet means having diameters less than the diameters of the plurality of large corner grommet means and that the slider retardation cord means is interlaced within the plurality of small grommet means to produce friction to retard the descent of the reefing slider means; a lower surface keel member means for providing an upper anchor point for the slider retardation cord means and the suspension lines; and a suspension riser assembly means for attaching the parachute assembly to the suspended payload and for providing a lower anchor point for the slider retardation cord means.

* * * * *